Feb. 3, 1925.
W. OWEN
1,525,146
GLASS CARRYING AND LAYING FRAME
Filed Sept. 11, 1923
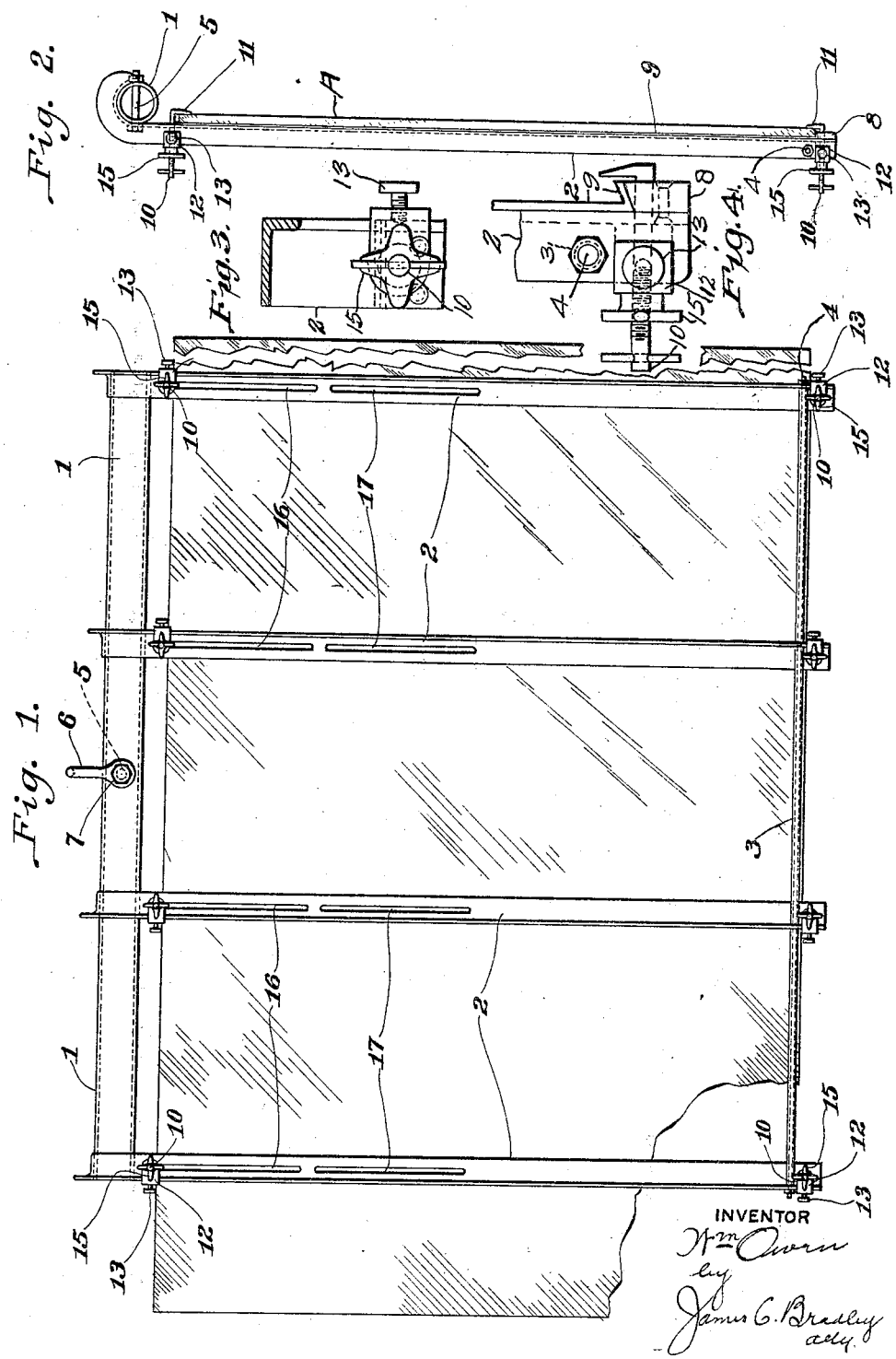
INVENTOR
Wm Owen
by
James C. Bradley
atty.

Patented Feb. 3, 1925.

1,525,146

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

GLASS CARRYING AND LAYING FRAME.

Application filed September 11, 1923. Serial No. 662,159.

*To all whom it may concern:*

Be it known that I, WILLIAM OWEN, a citizen of the United States, and a resident of Pittsburgh, in the county of Allegheny and State of Pennsylvania, have made a new and useful Invention in a Glass Carrying and Laying Frame, of which the following is a specification.

The invention relates to a frame for handling glass plates and particular heavy plates such as Carrara glass, although it may be used to advantage with thinner plates. It may be used to advantage in lifting the glass plates from the leer or surfacing table and transferring them to the vertical storage rack, or in removing the glass plates from the storage racks and transferring them to the surfacing tables. One embodiment of the invention is illustrated in the accompanying drawings wherein:

Figure 1 is a front elevation of the device in operative position supporting a glass plate A. Fig. 2 is an end elevation, and Figs. 3 and 4 are enlarged detail views of the hook construction at the lower edge of the frame.

The frame is made up of the pipe 1 at its upper edge, the vertical angles 2 and the tie rod 4 at the lower edge of the frame, which rod extends through the flanges of the angles 2 and is provided with suitable pipe spacers 3 intermediate the angles. The upper ends of the angles 2 are bent around the pipe 1 (Fig. 2) and secured thereto by means of the bolts 5. The frame is carried by a suitable crane (not shown) which engages the eye bolt 6 secured to the pipe 1 by means of the bolt 7.

Secured by rivets to the angles 2 at the lower ends thereof are the blocks 8 which together provide a ledge for supporting the lower edge of the sheet of glass to be lifted. These blocks and the inner faces of the angles 2 are provided with strips of cushioning material 9 (Fig. 4) such as rubber.

Extending through the flanges of the angles 2 at their lower ends and through the blocks 9 are the shanks 10 of the hooks 11. In order to increase the support of the shanks 10, the bearing blocks 12 are provided. These blocks are slotted so as to fit over the flanges 13 of the angles 2 (Fig. 4) and are clamped rigidly to such flanges by the set screws 14. The shanks 10 extend through these blocks and are held against turning by means of the lock nuts 15 threaded on the shanks and engaging the faces of the blocks 10.

A similar hook construction is provided at the upper ends of the angles 2, the hooks shown being similar throughout to those as just described above. In the case of these hooks, however, provision is made for adjusting them bodily up and down on the angles, this being accomplished by the use of the slots 16 and 17 through which the shanks of the hooks extend. This permits the use of the frame with glass sheets of widely varying width.

In picking up a sheet of glass from a table, such sheet is slid over the table so that one edge projects over the edge of the table, and the laying frame is lowered so that it lies on top of the sheet with the set of hooks 11 adjacent the pipe 1 engaged beneath the projecting edge of the sheet. The other edge of the sheet is then raised manually from the table a distance such that the lower set of hooks 11 can be positioned beneath the edge of the sheet by rotating them about their shanks. The crane may now be operated to lift the sheet to a vertical position and carry it to a storage rack. The glass is here lowered so that its lower edge rests upon the pegs of the rack, after which the hooks are released.

What I claim is:

1. In combination in a glass carrying and laying frame, a vertical framework, means for supporting the framework from its upper edge, and hook means along both edges of the frame on one side thereof, the hook means at one edge being movably mounted so that they may be adjusted so as to fit around the edge of the sheet of glass to be lifted.

2. In combination in a glass carrying and laying frame, a vertical framework, means for supporting the framework from its upper edge, and hook means along both edges of the frame on one side thereof, the hook means at both edges being movably mounted so that they may be adjusted to fit around the edges of the sheet of glass to be lifted.

3. In combination in a glass carrying and laying frame, a vertical framework, means for supporting the framework from its upper edge, and hook means along both edges of the frame on one side thereof, the hook means at one edge comprising a plurality of spaced hooks with shanks extending transversely of the framework, about which the hooks may be rotated to cause them to engage or disengage the edge of the sheet of glass to be lifted.

4. In combination in a glass carrying and laying frame, a vertical framework, means for supporting the framework from its upper edge, and hook means along both edges of the frame on one side thereof, the hook means at said edges comprising a plurality of spaced hooks with shanks extending transversely of the framework, about which the hooks may be rotated to cause them to engage or disengage the edge of the sheet of glass to be lifted.

5. In combination in a glass carrying and laying frame, a vertical framework, means for supporting the framework from its upper edge, and hook means along both edges of the frame on one side thereof, the hook means at one edge comprising a plurality of spaced hooks with shanks extending transversely of the framework, about which the hooks may be rotated to cause them to engage or disengage the edge of the sheet of glass to be lifted, said shanks being also adjustable bodily toward the other hook means.

6. In combination in a glass carrying and laying frame, a vertical framework, means for supporting the framework from its upper edge, hook means along both edges of the frame on one side thereof, the hook means at one edge comprising a plurality of spaced hooks with shanks extending transversely of the framework about which the hooks may be rotated to cause them to engage or disengage the edge of the sheet of glass to be lifted, and means for clamping the hooks in engaging positions.

7. In combination in a glass carrying and laying frame, a vertical framework, means for supporting the framework from its upper edge, a supporting ledge along the lower edge of the framework, securing hooks having shanks extending through the framework at its lower edge and adapted to be rotated to bring the hooks into holding engagement with the edge of the glass sheet to be lifted, and hook means along the other edge of the framework mounted for adjustment toward and from said securing hooks.

8. In combination in a glass carrying and laying frame, a vertical framework, means for supporting the framework from its upper edge, a supporting ledge along the lower edge of the framework, securing hooks having shanks extending through the framework at its lower edge and adapted to be rotated to bring the hooks into holding engagement with the edge of the glass sheet to be lifted, and hook means along the other edge of the framework mounted for adjustment toward and from said securing hooks, said last mentioned hook means also comprising a plurality of spaced hooks having shanks extending through the framework about which the hooks may be rotated.

In testimony whereof, I have hereunto subscribed my name this 18th day of August, 1923.

WILLIAM OWEN.